United States Patent
Bantz et al.

(10) Patent No.: US 6,807,542 B2
(45) Date of Patent: Oct. 19, 2004

(54) METHOD AND APPARATUS FOR SELECTIVE AND QUANTITATIVE RIGHTS MANAGEMENT

(75) Inventors: David Frederick Bantz, Chappaqua, NY (US); Thomas E. Chefalas, Somers, NY (US); Alexei A. Karve, Peekskill, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 09/929,216

(22) Filed: Aug. 14, 2001

(65) Prior Publication Data

US 2003/0037026 A1 Feb. 20, 2003

(51) Int. Cl.[7] .............................................. G06F 17/30
(52) U.S. Cl. .............................. 707/9; 10/100; 709/203
(58) Field of Search ............................. 707/1, 10, 100, 707/2–5, 9; 709/201, 203; 713/200–202

(56) References Cited

U.S. PATENT DOCUMENTS

| | | | |
|---|---|---|---|
| 5,629,980 A | 5/1997 | Stefik et al. | 705/54 |
| 5,634,012 A | 5/1997 | Stefik et al. | 705/39 |
| 5,715,403 A | 2/1998 | Stefik | 705/44 |
| 5,920,861 A | 7/1999 | Hall et al. | 707/9 |
| 5,991,876 A | 11/1999 | Johnson et al. | 713/200 |
| 6,006,332 A | 12/1999 | Rabne et al. | 713/201 |
| 6,112,181 A | 8/2000 | Shear et al. | 705/1 |
| 6,138,119 A | 10/2000 | Hall et al. | 707/9 |
| 6,185,683 B1 | 2/2001 | Ginter et al. | 713/176 |
| 6,513,061 B1 * | 1/2003 | Ebata et al. | 709/203 |
| 6,618,808 B1 * | 9/2003 | Johnson et al. | 713/200 |
| 6,654,754 B1 * | 11/2003 | Knauft et al. | 707/100 |
| 6,658,568 B1 * | 12/2003 | Ginter et al. | 713/193 |

* cited by examiner

*Primary Examiner*—Greta Robinson
*Assistant Examiner*—Cheryl Lewis
(74) *Attorney, Agent, or Firm*—Duke W. Yee; Louis P. Herzberg; Stephen J. Walder, Jr.

(57) ABSTRACT

A method, apparatus, and computer implemented instructions for managing rights to a service in a data processing system. A request is received from a user for the service. The rights to the service are identified. Content for the service is received. The content is selectively modified based on the rights identified. The content is sent to the user.

45 Claims, 4 Drawing Sheets

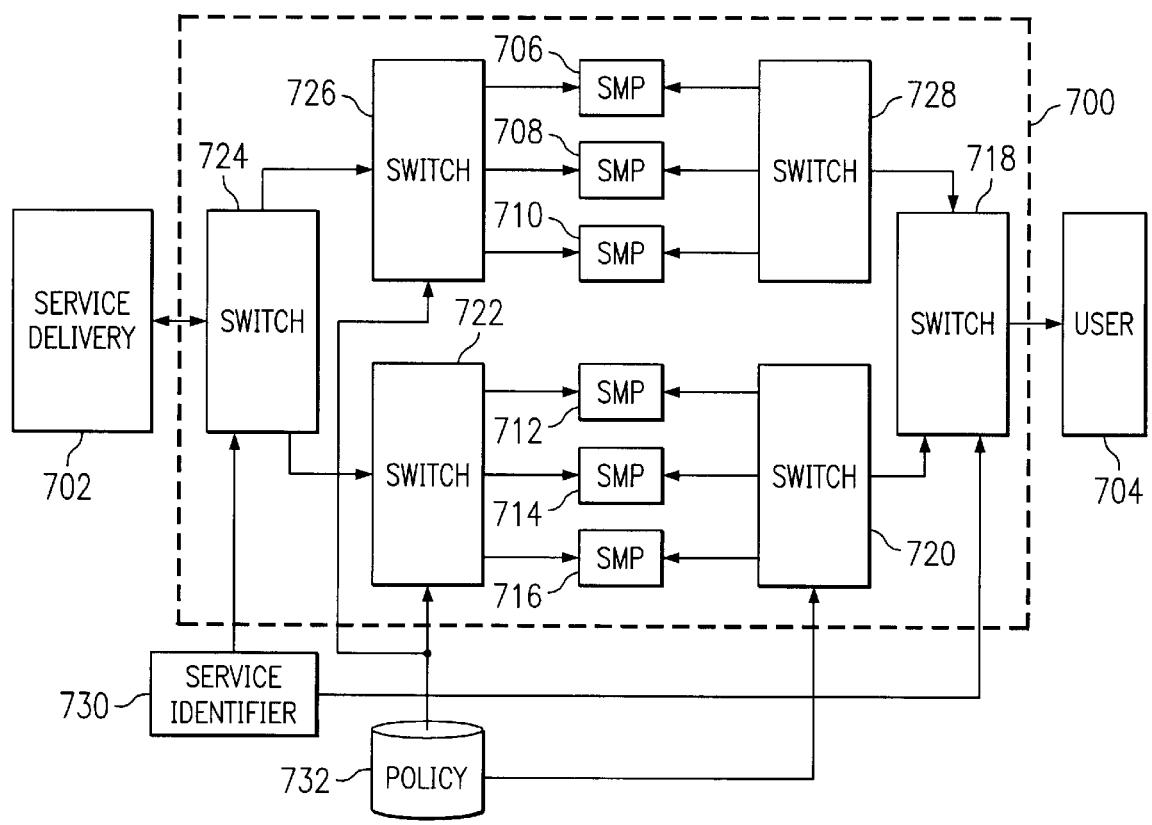

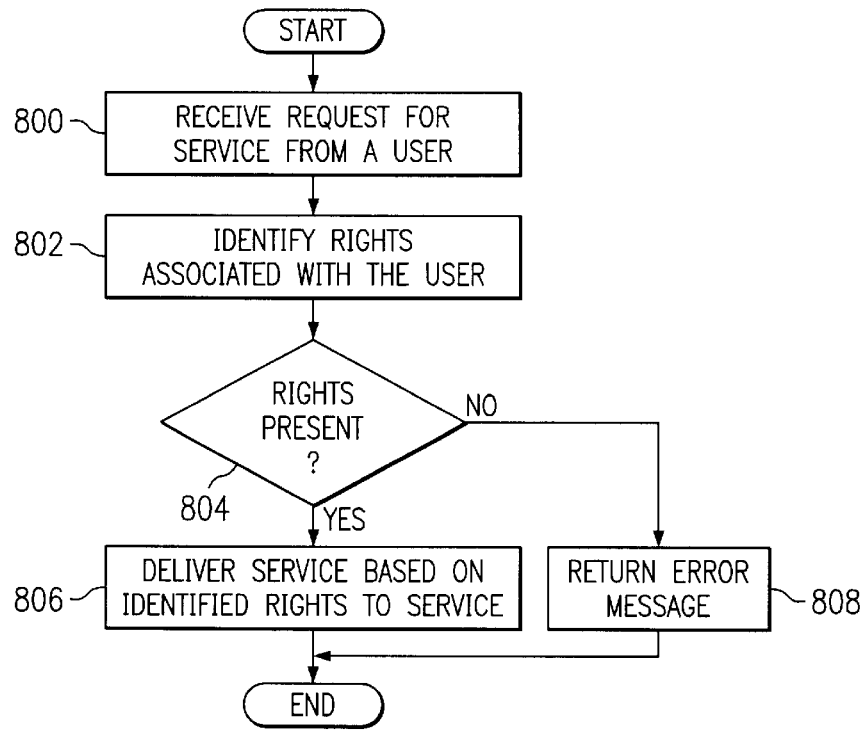
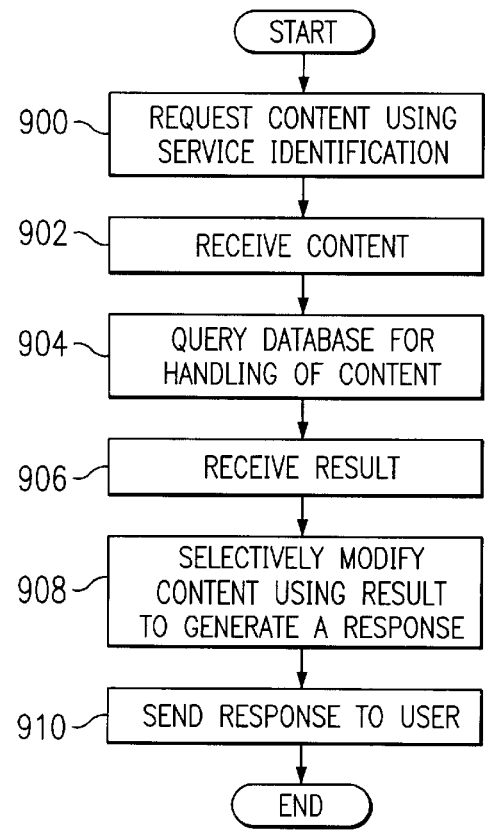

US 6,807,542 B2

METHOD AND APPARATUS FOR SELECTIVE AND QUANTITATIVE RIGHTS MANAGEMENT

BACKGROUND OF THE INVENTION

1. Technical Field

The present invention relates generally to an improved data processing system, and in particular to a method and apparatus for processing data. Still more particularly, the present invention provides a method, apparatus, and computer implemented instructions for managing rights to services provided over a network data processing system.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies that must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and businesses use the Web to purchase various goods and services. In off-ring goods and services, some companies offer goods and services solely on the Web while others use the Web to extend their reach.

With respect to the offering of services, many of these services are rights-based services in which a user temporarily or permanently acquires rights to use this service for a fee. These services may include, for example, a music service, a book service, a video service, or a stock research service. With a music service, a user may be entitled to download and receive various music titles. A user may receive books through a book service or movies through a video service. Various articles and historical data may be available to a user through a stock research service.

The manner in which rights are defined and managed are important with these types of services. Rights are acquired in exchange for payment or promise of payment; rights are revoked at the end of a service period. Rights are usually considered to be binary: either the user has the rights or not. It is customary for the service provider to grant rights to a prospective user, either for a limited period of time ("trial period") or for a restricted version of the service ("limited function") to allow the user to experience the service as a prelude to a more comprehensive commitment. It is also customary for the service provider to allow the user to retain rights to use the service for a short time ("grace period") after the end of the normal period of subscription. In all of these cases the rights to use the service are binary. When the user continues to retain rights to the service, the service provider may provide notices that the agreement or service period has terminated and that the user needs to re-sign or restart the agreement or service period. This, however, often does not provide sufficient incentive for the user to sign another agreement or continue paying for the service. If the service is terminated, the user may then re-sign or restart the service. In some cases, however, the user may find it easier to re-sign with another service provider.

Therefore, it would be advantageous to have an improved method, apparatus, and computer implemented instructions for selective and quantitative rights management to retain users of a service.

SUMMARY OF THE INVENTION

The present invention provides for a method, apparatus, and computer implemented instructions for managing rights to a service in a data processing system. A request is received from a user for the service. The rights to the service are identified. Content for the service is received. The content is selectively modified based on the rights identified, or other attributes of the service such as the immediacy and predictability of the service is selectively modified based on the rights identified, and the content is sent to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating example entries in a fulfillment database in accordance with a preferred embodiment of the present invention;

FIG. 6 is a diagram illustrating example entries in a policy database in accordance with a preferred embodiment of the present invention;

FIG. 7 is a diagram illustrating a service manifest subsystem in accordance with a preferred embodiment of the present invention;

FIG. 8 is a flowchart of a process used for managing rights to a service in accordance with a preferred embodiment of the present invention; and FIG. 9 is a flowchart of a process used for selectively modifying content for use in manifesting a service in accordance with a preferred embodiment of the present invention.

DETAILED DESCRIPTION OF THE PREFERRED EMBODIMENT

The present invention recognizes that it would be advantageous to service providers and perhaps to users if rights to use a service were more flexibly defined. For example, these rights may be defined in which the terms of rights have a continuous or discrete set of values, rather than a binary value in which the service is present or absent in its entirety. One example is a music service that allows a user to play music from a library of recordings. One attribute of this music service that may be varied is the quality level of the music. The quality level may be varied in terms of factors, such as, for example, the frequency response, distortion level, or signal-to-noise ratio of the music provided to the user. If the user is granted less than full rights to use this service, one manifestation of these quantitative rights could be degraded fidelity in the playing of the music. The service provider can manipulate the quantitative right in order to achieve business objectives.

Typically, a quantitative right grants a degraded service level to the user, but this is not always the case. The service may be provided at its maximum service level for a limited period of time, or the responsiveness of the service may be decreased, or the range of options, such as, in the example above, reducing the number of recordings in the library.

This notion of a quantitative right makes possible new, advantageous behaviors of the service. These behaviors may be advantageous to the user, to the service provider, or to both. As an example, consider the behavior of the music service at the end of the user's subscription period. Without quantitative rights, the service provider has two options: terminate the service completely or continue the service for a grace period. The provider's motivations are to stimulate the user to renew the service. Neither of the available options directly addresses these motivations: if the service is terminated, the user will have to face its unavailability, but that very unavailability may drive the user to seek options other than renewal. If the service is continued then the user has no motivation to renew.

With quantitative rights mechanism of the present invention, the service provider may gradually reduce the user's rights to the service, such as, degrading the fidelity of the music progressively. The user is reminded of the value of the service. Specifically, the user still hears the music, but is provided an incentive to renew the service and to restore the quality of the music to its former level. Similarly, during an initial trial period, the service provider may grant a quantitative right to the user that limits the range of available music while not limiting the display of options. This implementation provides the user an incentive to pay for full rights to the service so as to gain access to all of the available selections.

Figure 1:
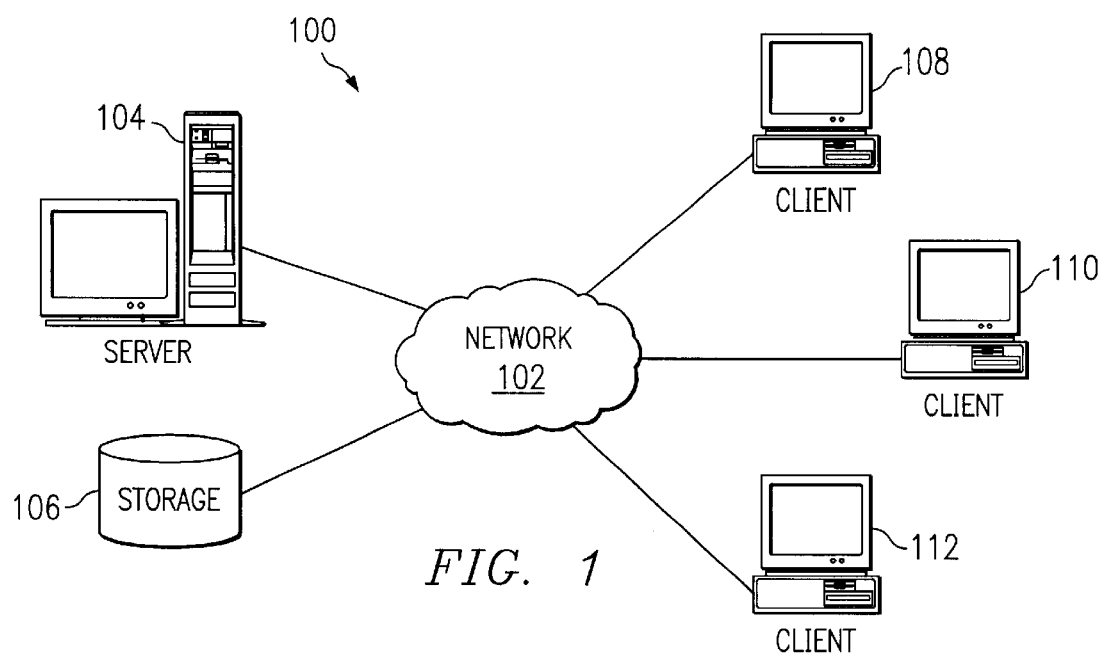
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. Network data processing system 100 illustrates a system in which selective and quantitative rights management of the present invention may be implemented.

In the depicted example, server 104 is connected to network 102 along with storage unit 106. In addition, clients 108, 110, and 112 are connected to network 102. These clients 108, 110, and 112 maybe, for example, personal computers or network computers. In the depicted example, server 104 provides services to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
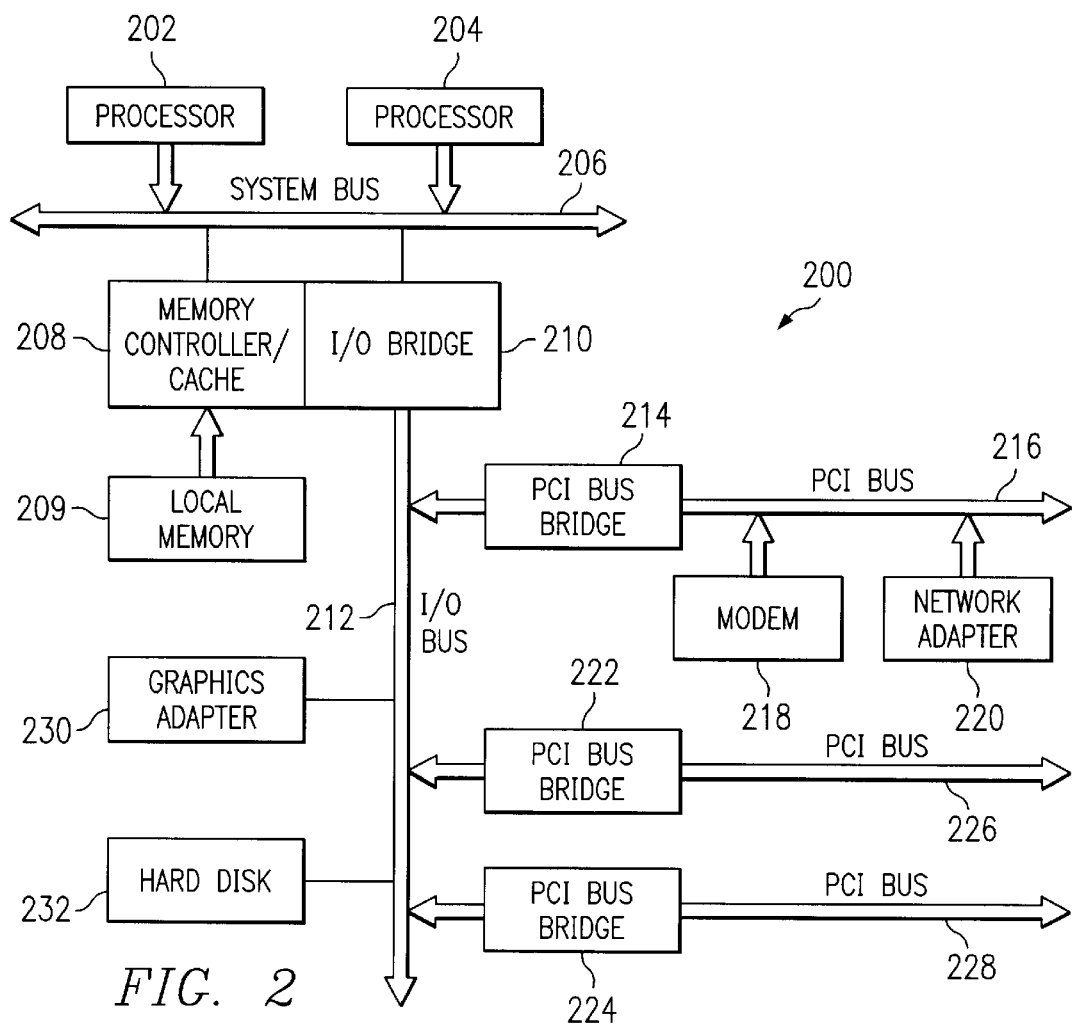
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
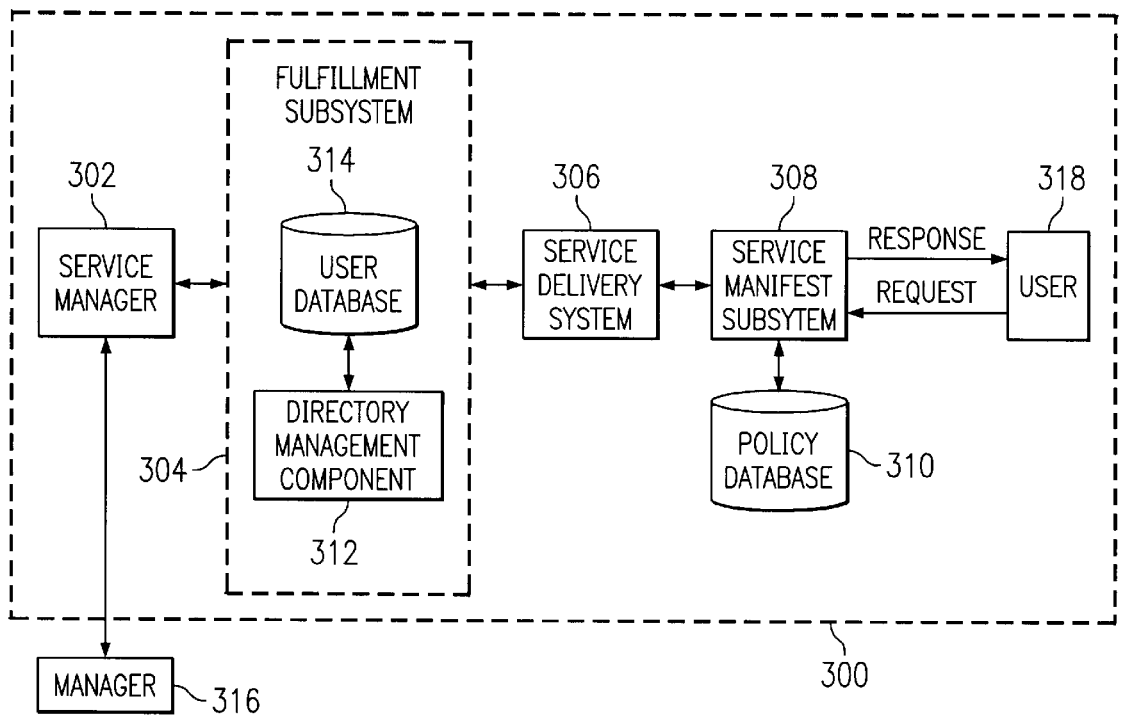
FIG. 3 is a block diagram of a service provider system in accordance with a preferred embodiment of the present invention.

With reference now to FIG. 3, a block diagram of a service provider system is depicted in accordance with a preferred embodiment of the present invention. More specifically, service provider system 300 in FIG. 3 illustrates a configuration for service rights management. Through service provider system 300, one or more services may be offered to users with quantitative rights management. Service provider system 300 includes service manager 302, fulfillment subsystem 304, service delivery subsystem 306, service manifest subsystem 308, and policy database 310. Fulfillment system 304 includes directory management component 312 and user database 314.

Service manager 302 provides the means by which manager 316 may interact with fulfillment subsystem 304 to manage rights for various users who subscribe to the service or services being offered. Specifically, service manager 302 may present a graphical user interface (GUI) to manager 316 allowing manager 316 to grant or revoke rights. If manager 316 is a computerized subsystem, service manager 302 may present an application programming interface (API) or messaging interface to manager 316. Service manager 302 interprets the actions of manager 316 and interacts with fulfillment subsystem 304 to grant or revoke rights. In these examples, the identification of users and rights are stored in user database 314. The information in user database 314 is managed through directory management component 312.

Figure 4:
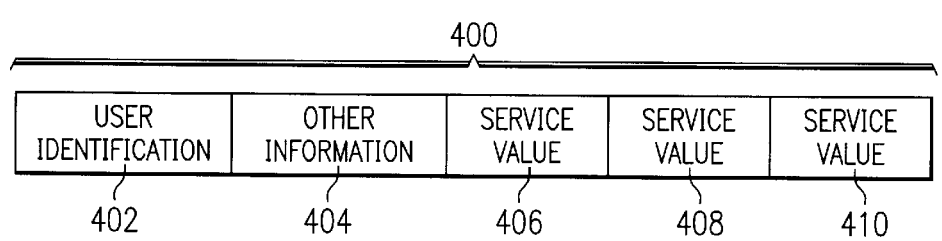
FIG. 4 depicts an entry in a rights management database in accordance with a preferred embodiment of the present invention.

In Web site design, fulfillment subsystem 304 is often implemented as a directory, specifically a directory implementing the lightweight directory access protocol (LDAP). Service manager 302 uses LDAP to communicate with directory management component 312 of the directory, which in turn, alters data stored in user database 314. As an example, FIG. 4 depicts an entry in a rights management database, such as user database 314 in FIG. 3. Entry 400 contains user identification field 402, other information field 404, service value field 406, service value field 408, and service value field 410. User identification field 402 is used to identify a user. This field is typically designated as a primary key by which the database can be searched. Other information field 404 contains information, such as demographic or preference information. Service value fields 406, 408, and 410 contain rights information pertaining to services offered to the user. If the rights were only a binary rights system, these fields need only hold one of two values, indicating that rights have been granted or not granted for the given user to the respective service. In the present invention, however, these rights may range through various values between granted and not granted for a particular service. Additionally, although three fields are shown, these fields are presented only for purposes of illustration and other numbers of fields may be used depending on the particular implementation.

Turning back to FIG. 3, service delivery subsystem 306 uses the LDAP protocol to access fulfillment subsystem 304. Each attempt by user 318 to use a service requires that service delivery subsystem 306 ascertain the identity of the user and the service, which is desired. This information is used by service delivery subsystem 306 to access fulfillment subsystem 304 with a query, using the LDAP protocol. The result of the query is to return the value of a selected field, such as service value field 406, service value field 408, and service value field 410 in FIG. 4, according to the service desired. If the returned field indicates that the given user has rights to the desired service, service delivery subsystem 306 can then proceed to deliver the desired service to user 318. Service delivery subsystem 306 may contain storage devices containing content for delivery to a user in response to a request for a service. This content may be, for example, music, video, electronic books, or Web pages. Alternatively, service delivery subsystem 306 may retrieve content from other sources outside of service provider system 300.

Service delivery subsystem 306 passes content retrieved in response to a request to service manifest subsystem 308, which manifests or delivers the content for the service to user 318. User 318 accesses the service through service manifest subsystem 308. The purpose of service manifest subsystem 308 is to modulate the presentation of the service to user 318 in accordance with the quantitative right stored for that service in a directory entry, such as entry 400 in FIG. 4.

Service manifest subsystem 308 can manifest or provide the service in many ways, some of which have been previously described. The selection of the specific manifestation of the service is identified by consulting policy database 310. In these examples, a set of rules are stored in policy database 310. Each rule determines the way in which the service will be manifested to user 318. For example, one rule may direct service manifest subsystem 308 to add noise to reproduced music if the user's rights are less than complete. This rule may consult other databases, customizing the service manifestation on such factors as the status of the user as a preferred or non-preferred user, the set of other services to which the user is subscribed, the financial status of the user, and the like. In the depicted examples, user 318 and service delivery subsystem 306 communicate using the HTTP.

In this example, service delivery subsystem 306 is unaffected by the specific choice made by service manifest subsystem 308 to select the way the service is to be presented to user 318. This configuration is desirable because the configuration separates the implementation of service delivery subsystem 306 from the specific ways in which a quantitative right is granted to user 318. The specific way in which a content for a service is modified before it is presented to user 318 is determined by the combination of service manifest subsystem 308 and policy database 310.

Quantitative rights, represented by sets of service values in entry 400 in FIG. 4 may represent other modifications to service delivery. For example, they may represent a priority for temporarily blocking service to a given user. Users with more rights to a given service may be the last to be deprived of that service given conditions of resource exhaustion within the Web site. Users with the fewest rights to a given service may be the first to see their service suspended if the service provider needs to free resources to serve others.

With reference now to FIG. 5, a diagram illustrating example entries in a fulfillment database is depicted in accordance with a preferred embodiment of the present invention. In this example, entries 500 are examples of user identification and service value information, which may be found in a fulfillment database, such as user database 314 in FIG. 3. In this example, one service value is associated with each user identification. If a particular user requests the service, the user identification in the request received from the user is used as a key or index to identify the appropriate entry. In these examples, the value for the service is identified as being a value ranging from 1–4. This value is used by a service manifest subsystem, such as service manifest subsystem 308 in FIG. 3, to determine the appropriate manner in which the content is to be delivered to the user.

Turning next to FIG. 6, a diagram illustrating example entries in a policy database is depicted in accordance with a preferred embodiment of the present invention.

In this example, entries 600 are examples of entries that may be found in a policy database, such as policy database 310 in FIG. 3. Each entry includes a value and a rule. These rules are directed towards handling of audio content in these examples. The value, in this example, serves as an index or key to) identify a rule that is to be applied to manifesting a service to a user. In this example, entry 602 indicates that no modification is to be made to the content. Entry 604 indicates that noise is to be added to the content. Entry 606 indicates only 80 percent on the content is to be delivered, and entry 608 indicates that the service is only to be provided after 8 p.m. The particular entries are identified from a service value returned from a user database, such as user database 314 in FIG. 3.

With reference now to FIG. 7, a diagram illustrating a service manifest subsystem is depicted in accordance with a preferred embodiment of the present invention. Service manifest subsystem 700 may be implemented as a service manifest subsystem, such as service manifest subsystem 308 in FIG. 3. Service manifest subsystem 700 is used as an intermediary between service delivery subsystem 702 and user 704, acting as a proxy for both.

Service manifest subsystem 700 includes service manifest processors (SMPs) 706, 708, 710, 712, 714, and 716. These processors are used to process content for delivery to user 704. Service manifest subsystem 700 also includes switches 718, 720, 722, 724, 726, and 728. These switches are used to direct content received from service delivery subsystem 702 to different processors within service manifest subsystem 706. These switches then direct the content to user 704. In other words, these switches are used to define paths within service manifest subsystem 700.

Service identifier 730 contains an identification of the service currently being provided to user 704. This service identifier is obtained from a request from user 704. The identification of the user is used to obtain a service value associated with the user for the identified service from a user database, such as user database 314 in FIG. 3. This service value is used to identify a rule, such as policy 732. Policy 732 contains information obtained from a search of a policy database, such as policy database 310 in FIG. 3. This information in policy 732 is used to selectively modify content for delivery to a user. Service identifier 730 controls switches 718 and 724, which select paths through service manifest subsystem 700. Policy 732 controls switches 720, 722, 726, and 728 for sub-paths, selecting service manifest processors 706, 708, and 710, and service manifest processors 712, 714 or 716. Service manifest processor 706, 708, and 710 are located in one path, while service manifest processors 712, 714, and 716 are located in another path. Each path is for a particular type of service. The different service manifest processors, located within sub-paths for each path, are used to handle different types of modifications of content based on the quality of service that is to be provided to a user. Thus, the combination of service identifier 730 and policy 732 selects one unique path through service manifest subsystem 700 between service delivery subsystem 702 and user 704.

Service manifest processors 706, 708, 710, 712, 714, and 716 perform distinct operations on the data that flows from service delivery subsystem 702 to user 704. For example, if the service is music delivery and the policy directs the addition of noise to the data representing music, the policy database might contain a policy that selects service manifest processor 706, whose function is to add noise to music samples. Other service manifest processors may interrupt the flow of music samples at certain times of the day, or may act on the forms representing music selections to limit the number that can be selected by the user.

The illustration of service manifest subsystem 700 is illustrated for purposes of illustration only and not as a limitation to the particular manner in which this subsystem may be implemented. In particular, the processing may be handled through a single processor other than those shown in FIG. 7. Additionally, although only two paths are shown, corresponding to two distinct services, other numbers of paths may be used depending on the particular implementation.

Turning next to FIG. 8, a flowchart of a process used for managing rights to a service is depicted in accordance with a preferred embodiment of the present invention. The process illustrated in FIG. 8 may be implemented in a service provider system, such as service provider system 300 in FIG. 3.

The process begins by receiving a request for service from a user (step 800). Next, rights associated with the user are identified (step 802). These rights may be identified through a user database, such as user database 314 in FIG. 3. A determination is made as to whether rights for the user are present (step 804). If user rights are present, the service is delivered based on the identified rights to service (step 806) with the process terminating thereafter. If user rights are not present, an error message is returned (step 808) and the process terminates. In the second case when user rights are absent, the user has no service agreement with the provider or the service agreement has expired for such a long time that service is no longer provided.

With reference now to FIG. 9, a flowchart of a process used for selectively modifying content for use in manifesting a service is depicted in accordance with a preferred embodiment of the present invention. The process illustrated in FIG. 9 may be implemented in a service manifest subsystem, such as service manifest subsystem 308 in FIG. 3.

The process begins by requesting a content using a service identification (step 900). Next, content is received (step 902). A database is queried for handling of the content (step 904), and a result is received (step 906). Then, the content is selectively modified using the result to generate a response (step 908). A response is sent to the user (step 910) and the process terminates.

The mechanism of the present invention may be applied to many specific business applications of the present invention. Specifically, in the case of the subscription computing or outsourced information technology business, the user of various services (anti-virus, backup, support) can be granted quantitative rights and the mechanisms described in this embodiment can be used to enforce them. Less-than-full rights may be applied to other services, such as subscription computing services, which may include, for example, back-up services, anti-virus services, and support services.

The mechanism of present invention provides a method, apparatus, and computer implemented instructions for handling quantitative rights. The mechanism of the present invention provides a flexible implementation of quantitative rights, such that as the service provider varies the degree of the right, the manifestation of that variance can take alternative forms. The choice of the alternative can be based on many factors, but this choice does not complicate the manipulation of the right: the provider merely increases the level of the right granted, or increases the degree to which the right has been revoked. Since the manipulation (or management) of the right is the subject of one business process (namely service provisioning) and the manifestation of quantitative rights is the subject of another (policy) this separation of management and manifestation is beneficial.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing rights to a service, the method comprising:
   receiving a request from a user for the service;
   identifying the rights to the service based on time received request, wherein the rights may be of a type between zero access rights and full access rights, inclusively;
   retrieving content for the service;
   selectively modifying the content based on the rights identified, wherein if the rights are not full access rights and are not zero access rights, selectively modifying the content based on the rights includes degrading a level of quality of an output of the content such that the degraded level of quality of the output is less than a level of quality of output corresponding to full access rights but higher than a level of quality of output corresponding to zero access rights; and
   sending the modified content to the user.

2. The method of claim 1, wherein the content is at least one of a document, a graphical image, a Web page, an audio file, and data.

3. The method of claim 1, wherein the service is at least one of a music service, a book service, and a stock research service.

4. The method of claim 1, wherein the method is implemented in a service manifest.

5. The method of claim 1, wherein the content is modified if a subscription to the service has expired.

6. The method of claim 1, wherein the content is selectively modified based on a level of service subscribed to by the user.

7. The method of claim 1, further comprising selectively modifying attributes of the service-based on the identified rights to the content, wherein the attributes of the service selectively modified include at least one of a quality of the service, an immediacy of the service, and a predictability of the service.

8. A method in a data processing system for managing rights to a service, the method comprising:
   responsive to receiving a request for a service from a user, determining whether a subscription to the service by the user has expired;
   responsive to a determination, that the subscription has expired, selectively modifying the content to form a modified content, wherein the modified content is a degraded quality version of the content that would be provided to the user if the user had a non-expired subscription; and
   returning the modified content to the user such that the modified content is presented to the user.

9. The method of claim 8, wherein the content is a music file.

10. A method in a data processing system for managing rights to a service, the method comprising:
    responsive to receiving a request for a service from a user, determining whether a subscription to the service by the user has expired;
    responsive to a determination, that the subscription has expired, selectively modifying the content to form a modified content; and
    returning the modified content to the user, wherein the content is a music file, and wherein the modified content includes noise added to the music file.

11. The method of claim 10, wherein on amount of the noise added to the music file is based on when the subscription expired.

12. A method in a data processing system for managing a subscription computing service, the method comprising:
    receiving a request from a user for the subscription computing service;
    identifying rights to the subscription computing service based on an identification of the user, wherein the rights may be of a type between zero access rights and full access rights, inclusively; and
    selectively modifying the subscription computing service based on the rights identified, wherein if the rights are not full access rights and are not zero access rights, selectively modifying the subscription computing service based on the rights includes degrading a level of quality of the subscription computing service such that the degraded level of quality of the subscription service is less than a level of quality of a subscription computing service corresponding to full access rights but higher than a level of quality of a subscription computing service corresponding zero access rights.

13. The method of claim 12, wherein the subscription computing service includes at least one of an on-line help desk, a backup service, and an application update service.

14. A service delivery system comprising:
a database of users and rights associated with the users;
a service delivery unit, wherein the service delivery system retrieves content; and
a service manifest, wherein the service manifest selectively modifies the content based on a right to the content associated with a user requesting the content, wherein the right may be of a type between zero-access rights and a full access right, inclusively, and wherein in the right is not a full access right and is not a zero access right, the service manifest selectively modifies the content by degrading a level of quality of an output of the content such that the degraded level of quality of the output is less than a level of quality of output corresponding to a full access right but higher than a level of quality of output corresponding to a zero access right.

15. The service delivery system of claim 14, wherein the service manifest includes a set of processing paths used to modify content, wherein each processing path within the set of processing paths modifies the content in a different manner.

16. The service delivery system of claim 14, when the database is located in a fulfillment subsystem.

17. The service delivery system of claim 14, wherein the service manifest is a proxy server.

18. The service delivery system of claim 14, wherein the service manifest modifies the content based on a policy.

19. A data processing system comprising:
a bus system;
a communications unit connected to the bus system;
a memory connected to the bus system, wherein the memory includes a set of instructions; and
a processing unit connected to the bus system, wherein the processing unit executes the set or instructions to receive a request for a user for a service; identify the rights to the service based the received request, wherein the rights may be of a type between zero access rights and full access rights, inclusively; retrieve content for the service; selectively modify the content based on the rights identified, wherein if the rights are not full access rights and are not zero access rights, selectively modifying the content based on the rights includes degrading a level of quality of an output of the content such that the degraded level of quality of the output is less than a level of quality of output corresponding to full access rights but higher than a level of quality of output corresponding to zero access rights; and send the modified content to the user.

20. A data processing system comprising:
a bus system;
a communications unit connected to the bus system;
a memory connected to the bus system, wherein the memory includes a set of instructions; and
a processing unit connected to the bus system, wherein the processing unit executes the set of instructions to determine whether a subscription to a service by a user has expired in response to receiving a request for the service from the user; selectively modify content to form a modified content in response to a determination that the subscription has expired, wherein the modified output is a degraded quality version of the content that would be provided to the user if the user had a non-expired subscription; and return the modified content to the user such that the modified content is presented to the user.

21. A data processing system comprising:
a bus system;
a communications unit connected to the bus system;
a memory connected to the bus system, wherein the memory includes a set of instructions; and
a processing unit connected to the bus system, wherein the processing unit executes the set of instructions to receive a request from a user for a subscription computing service; identify rights to a subscription computing service based on an identification of a user, wherein the rights may be of a type between zero access rights and full access rights inclusively; and selectively modify the subscription computing service based on the rights identified, wherein if the right is not a full access right and is not a zero access right, selectively modifying the subscription computing service includes degrading a level of quality of the subscription such that the degraded level of quality of the subscription computing service is less than a level of quality of a subscription computing service corresponding to a full access right but higher than a level of quality of the subscription computing service corresponding to a zero access right.

22. A data processing system for managing rights to a service, the data processing system comprising:
receiving means for receiving a request from a user for the service;
identifying means for identifying the rights to the service, wherein the rights may be of a type between zero access rights and full access rights inclusively;
retrieving means for retrieving content for the service;
modifying means for selectively modifying the content based on the rights identified, wherein if the rights are not full access rights and are not zero access rights, selectively modifying the content based on the rights includes degrading a level of quality of an output of the content such that the degraded level of quality of the output is less than a level of quality of output corresponding to full access rights but higher than a level of quality of output corresponding to zero access rights; and
sending means for sending the modified content to the user.

23. The data processing system of claim 22, wherein the content is at least one of a document, a graphical image, a Web page, an audio file, and data.

24. The data processing system of claim 22, wherein the service is at least one of a music service, a book service, and a stock research service.

25. The data processing system of claim 22, wherein the method is implemented in a service manifest.

26. The data processing system of claim 22, wherein the content is modified if a subscription the service has expired.

27. The data processing system of claim 22, wherein the content is selectively modified based on a level of service subscribed to by the user.

28. A data processing system for managing rights to a service, the data processing system comprising:
- determining means, responsive to receiving a request for a service from a user, for determining whether a subscription to the service by the user has expired;
- modifying means, responsive to a determination that the subscription has expired, for selectively modifying the content to form a modified content, wherein the modified content is a degraded quality version of the content that would be provided to the user if the user had a non-expired subscription; and
- returning means for returning the modified content to the user such that the modified content is presented to the user.

29. The data processing system of claim 28, wherein the content is a music file.

30. A data processing system for managing rights to a service, the data processing system comprising:
- determining means, responsive to receiving a request for a service from a user, for determining whether a subscription to the service by the user has expired;
- modifying means, responsive to a determination that the subscription has expired, for selectively modifying the content to form a modified content; and
- returning means for returning the modified content to the user, wherein the content is a music file, and wherein the modified content includes noise added to the music file.

31. The data processing system of claim 30, wherein an amount of the noise added to the music file is based on when the subscription expired.

32. A data processing system for managing a subscription computing service, the data processing system comprising:
- receiving means for receiving a request from a user for the subscription computing service;
- identifying means for identifying rights to the subscription computing service based on an identification of the user, wherein the rights may be of a type between zero access rights and full access rights inclusively; and
- modifying means for selectively modifying the subscription computing service based on the rights identified, wherein if the rights are not full access rights and are not zero access rights, selectively modifying the subscription computing service based on the rights includes degrading a level of quality of the subscription computing service such that the degraded level of the subscription computing services is less than a level of quality of a subscription computing services corresponding to full access rights but higher than a level of quality of a subscription computing service corresponding to zero access rights.

33. The data processing system of claim 32, wherein the subscription computing service includes at least one of an on-line dash help desk, a backup service, and an application update service.

34. A computer program product in a computer readable medium for managing rights to a service, the computer program product comprising:
- first instructions for receiving a request from a user for the service;
- second instructions for identifying the rights to the service based on the received request, wherein the rights may be of a type between zero access rights and full access rights, inclusively;
- third instructions for retrieving content for the service;
- fourth instructions for selectively modifying the content based on the rights identified, wherein if the rights are not full access rights and are not zero access rights, selectively modifying the content based on the rights includes degrading a level of quality of an output of the content such that the degraded level of quality of the output is less than a level of quality of output corresponding to full access rights but higher than a level of quality of output corresponding to zero access rights; and
- fifth instructions for sending the modified content to the user.

35. The computer program product of claim 34, wherein the content is at least one of a document, a graphical image, a Web page, an audio file, and data.

36. The computer program product of claim 34, wherein the service is at least one of a music service, a book service, and a stock research service.

37. The computer program product of claim 34, wherein the method is implemented in a service manifest.

38. The computer program product of claim 34, wherein the content is modified if a subscription to the service has expired.

39. The computer program product of claim 34, wherein the content is selectively modified based on a level of service subscribed to by the user.

40. A computer program product in a computer readable medium for managing rights to a service, the computer program product comprising:
- first instructions, responsive to receiving a request for a service from a user, for determining whether a subscription to the service by the user has expired;
- second instructions, responsive to a determination that the subscription has expired, for selectively modifying the content to form a modified content, wherein the modified content is a degraded quality version of the content that would be provided to the user if the user had a non-expired subscription; and
- third instructions for returning the modified content to the user such that the modified content is presented to the user.

41. The computer program product of claim 40, wherein the content is a music file.

42. A computer program product in a computer readable medium for managing rights to a service, the computer program product comprising:
- first instructions, responsive to receiving a request for a service from a user, for determining whether a subscription to the service by the user has expired;
- second instructions, responsive to a determination that the subscription has expired, for selectively modified the content to form a modified content; and
- third instruction for returning content to the user, wherein the content is a music file, and wherein the modified content includes noise added to the music file.

43. The computer program product of claim 42, wherein an amount of the noise added to the music file is based on when the subscription expired.

44. A computer program product in a computer readable medium for managing a subscription computing service, the computer programming product comprising:
- first instructions for receiving a request from a user for the subscription computing services;
- second instructions for identifying rights to the subscription computing service based on an identification of the user, wherein the rights may be of a type between zero access rights and full access rights, inclusively; and third instructions for selectively modifying the subscription computing service based on the rights identified, wherein the rights are not full access rights are not zero access rights, selectively modifying the subscription computing service based on the rights includes degrading a level of quality of the subscription computing service such that the degraded level of quality of the subscription computing service is less than a level of quality of a subscription computing service corresponding to full access rights but higher than a level of quality of a subscription computing service corresponding to zero access rights.

45. The computer program product of claim 44, wherein the subscription computing service includes at least one of an on-line dash help desk, a backup service, and an application update service.

* * * * *

UNITED STATES PATENT AND TRADEMARK OFFICE
CERTIFICATE OF CORRECTION

PATENT NO. : 6,807,542 B2
DATED : October 19, 2004
INVENTOR(S) : Bantz et al.

It is certified that error appears in the above-identified patent and that said Letters Patent is hereby corrected as shown below:

Column 9,
Line 58, after "based on" delete "time" and insert -- the --.

Column 10,
Line 20, after "attributes of the" delete "service-based" and insert -- service based --.
Line 45, after "determination" delete ",".
Line 51, after "wherein" delete "on" and insert -- an --.

Column 11,
Line 3, after "subscription" insert -- computing --.
Line 7, after "corresponding" insert -- to --.
Lines 18-19, after "between" delete "zero-access rights" and insert -- a zero access right --.
Line 20, before "the right is not" delete "in" and insert -- if --.
Line 45, after "set" delete "or" and insert -- of --.
Line 46, after "request" delete "for" and insert -- from --.

Column 12,
Line 27, after "subscription" insert -- computing service --.
Line 31, after "quality of" delete "the" and insert -- a --.
Line 63, after "subscription" insert -- to --.

Column 13,
Line 46, after "level of" insert -- quality of --.
Line 48, after "computing" delete "services" and insert -- service --.

Column 14,
Line 51, after "selectively" delete "modified" and insert -- modifying --.
Line 53, after "third" delete "instruction for returning content" and insert -- instructions for returning the modified content --.
Line 61, after "computer" delete "programming" and insert -- program --.
Line 63, after "computing" delete "services" and insert -- service --.

UNITED STATES PATENT AND TRADEMARK OFFICE
CERTIFICATE OF CORRECTION

PATENT NO. : 6,807,542 B2
DATED : October 19, 2004
INVENTOR(S) : Bantz et al.

It is certified that error appears in the above-identified patent and that said Letters Patent is hereby corrected as shown below:

Column 15,
Line 3, after "wherein" insert -- if --.
Line 3, after "access rights" insert -- and --.

Signed and Sealed this

Twenty-seventh Day of September, 2005

JON W. DUDAS
*Director of the United States Patent and Trademark Office*